Oct. 20, 1959 P. HAGSPIHL 2,909,586
SINTERED PLATE ELECTRODE WITH EXPANDED-METAL GRID
Filed Dec. 8, 1952 2 Sheets-Sheet 1

Inventor
Paul Hagspihl
by Karl Michaelis, atty.

Oct. 20, 1959        P. HAGSPIHL        2,909,586
SINTERED PLATE ELECTRODE WITH EXPANDED-METAL GRID
Filed Dec. 8, 1952        2 Sheets-Sheet 2

Inventor
Paul Hagspihl
by Karl Michaelis,
atty.

United States Patent Office 2,909,586
Patented Oct. 20, 1959

2,909,586

SINTERED PLATE ELECTRODE WITH EXPANDED-METAL GRID

Paul Hagspihl, Hagen, Westphalia, Germany, assignor to Accumulatoren-Fabrik Aktiengesellschaft, Hagen, Westphalia, Germany, a joint-stock company under German law Application December 8, 1952, Serial No. 324,693

Claims priority, application Germany December 18, 1951

2 Claims. (Cl. 136—28)

This invention relates to sintered metal bodies adapted for use as electrodes in alkaline accumulators or storage cells.

It is an object of this invention to improve the mechanical resistivity of such bodies.

As is well known to those skilled in the art, the porous sintered metal bodies serving as carriers for the active mass in alkaline accumulators are, as a rule, reinforced mechanically by placing them on metal frames or surrounding them with metal frames. In addition to this, an electrically conductive, but electrochemically inactive material in the form of wires, ribbons, rods, perforated sheets or metal wool, metal chips, metal gauze and the like is forced into the mass and may be connected with it by sintering, and the metal frames or inserts, forming part of a sintered plate electrode may serve as current leads.

I have now found that expanded metal is particularly adapted for use as a skeleton for the active mass and imparts to the plate very favorable properties. If the metal is subject to corrosive attack by the alkaline electrolyte, it should, of course, be subjected to galvanic or other treatment designed to render it inert (electrochemically inactive).

In the drawings affixed to this specification and forming part thereof some embodiments of the invention are illustrated diagrammatically by way of example.

In the drawings a sintered electrode is shown with an expanded metal grid embedded in the sintered active mass Fig. 1 is an elevation of this electrode, Fig. 2 being a vertical cross-section on the line I—I in Fig. 1.

Figure 1:
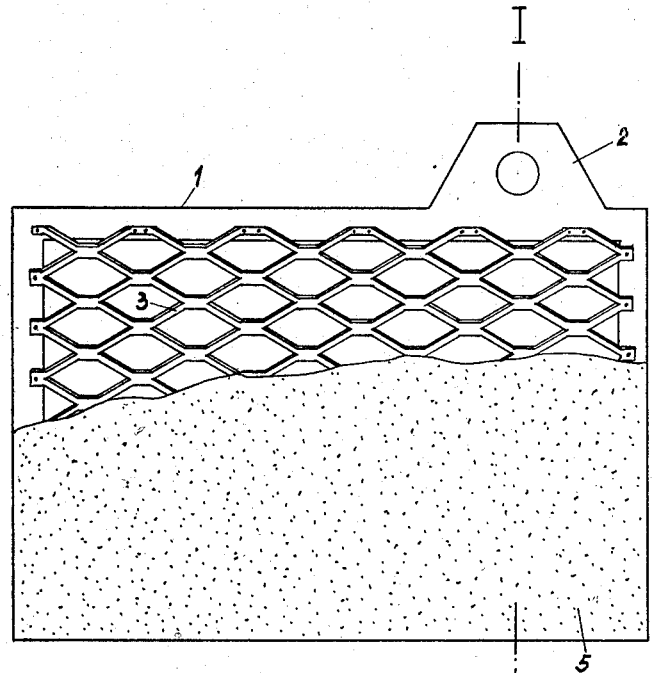
Figure 2:
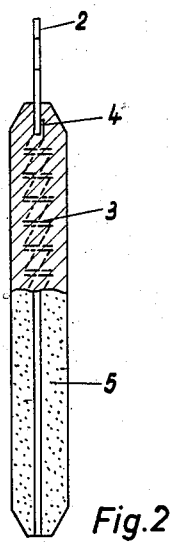

Referring to the drawings and first to Figs. 1 and 2, 1 is a metal frame and 2 is the contact lug. 3 is an expanded metal grid and 4 are leads connecting same to the frame 1. 5 is the sintered active mass enveloping the grid and the two surfaces of the frame.

Figure 3:
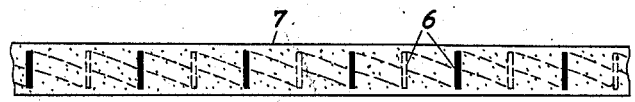
Fig. 3 shows in cross-section an electrode in which the expanded-metal grid is embedded altogether in the sintered active mass.
Figure 4:
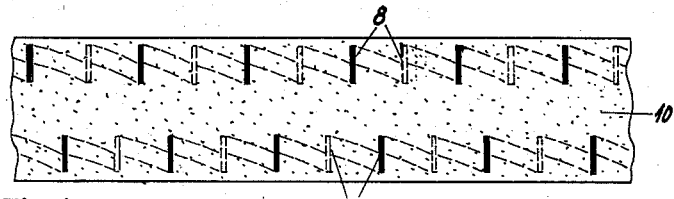
Fig. 4 is another embodiment showing two such skeletons embedded in the mass.

In Fig. 3 a large expanded-metal grid 6 is embedded altogether in the sintered active mass 7, and in Fig. 4 an electrode of greater thickness is shown as having two expanded metal grids 8 and 9 embedded in the sintered active mass 10.

Figure 5:
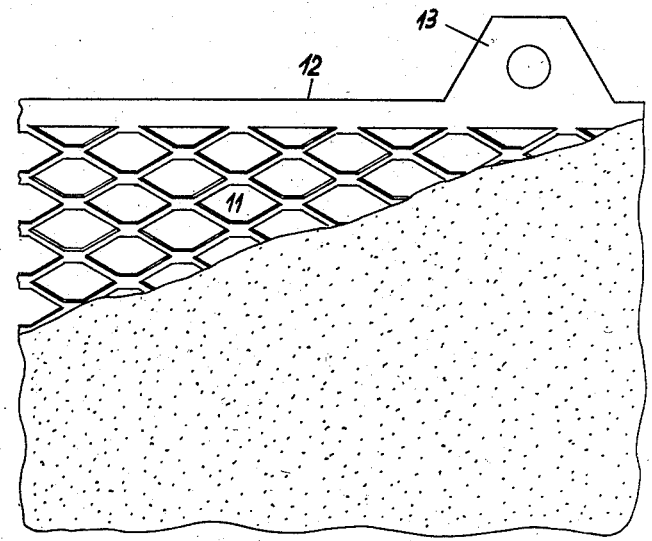
Fig. 5 shows the expanded-metal grid made in one piece with the contact lug.

Fig. 5 shows an expanded-metal grid 11 formed from the metal of the frame 12 and of the contact lug 13.

It is obvious that in view of the particular advantages offered by the expanded metal, in whose production no metal is wasted, the elasticity and mechanical strength characteristic of expanded metal sheets is imparted also to the sintered plate itself. Owing to the subdivision of the sintered cake by the grid into a great number of parallel sections the forces generated by the shrinking of the mass during sintering are also subdivided and are not sufficiently strong to disrupt the cake which is thus free from any cracks.

Since the cake does not undergo any considerable shrinking, its porosity becomes greater than that of the sintered cakes hitherto produced and its mechanical strength is not reduced. The complete and uniform penetration of the sintered structure with a current-conductive insert and the large contact surface with the sintered body contributes to a particularly favorable entrance and exit of the current.

The higher porosity of the sintered body renders it possible to better and more uniformly impregnate the plate with active mass and leads to an increase of the mass absorbed.

Since the webs of the expanded-metal sheet extend substantially at right angles to the plane of the sheet, the mass is not rendered inaccessible on one side and therefore can participate throughout their depth from one to the other surface in the electrochemical reactions.

If the expanded-metal body is used without a frame, it will be provided with the necessary current leads. The contact lug can be made out of the expanded-metal body.

By distending this body so as to distort the rhombic perforations, one can vary the degree of elasticity of the grid, so that the sintered cake is able to give way or resist to the shrinking forces arising during the sintering and to the expanding tendency developing during operation of the accumulator.

I wish it to be understood that I do not desire to be limited to the details described in the foregoing specification and shown in the drawings for obvious modifications will occur to a person skilled in the art.

I claim:

1. A sintered metal electrode for alkaline accumulators of increased electric efficiency, said electrode having a grid of expanded metal embedded in the sintered metal whereby the porosity of the sintered body is increased because of reduced sintering shrinkage and the receptivity of the sintered body for active material is correspondingly improved.

2. A sintered metal electrode for alkaline accumulators of increased electric efficiency comprising a mass of sintered metal, a metal frame surrounding said sintered mass, and a grid of expanded metal embedded in the sintered mass and electrically connected to said frame, said grid differing from said sintered mass and being electrochemically inert.

References Cited in the file of this patent

UNITED STATES PATENTS

| 664,438 | Sargent | Dec. 25, 1900 |
| 1,918,947 | Williams | July 18, 1933 |
| 1,982,485 | Salmon et al. | Nov. 27, 1934 |
| 2,251,913 | Brennan | Aug. 12, 1941 |
| 2,544,112 | Schneider | Mar. 6, 1951 |
| 2,672,494 | Fleischer | Mar. 16, 1954 |